United States Patent
Fujiyama et al.

(10) Patent No.: US 8,345,163 B2
(45) Date of Patent: Jan. 1, 2013

(54) IMAGE PROCESSING DEVICE AND METHOD AND IMAGE DISPLAY DEVICE

(75) Inventors: Naoyuki Fujiyama, Tokyo (JP); Yoshiki Ono, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/195,964

(22) Filed: Aug. 2, 2011

(65) Prior Publication Data

US 2012/0033137 A1   Feb. 9, 2012

(30) Foreign Application Priority Data

Aug. 3, 2010   (JP) ................................ 2010-174296

(51) Int. Cl.
*H04N 5/21* (2006.01)
(52) U.S. Cl. ................. 348/607; 348/620; 348/699
(58) Field of Classification Search .................. 348/607, 348/624, 619, 620, 621, 699, 700, 701; 382/255, 382/260, 264, 274, 275, 266; *H04N 5/21, H04N 5/14, 9/64*
See application file for complete search history.

(56) References Cited

U.S. PATENT DOCUMENTS

| | | | |
|---|---|---|---|
| 2008/0232708 A1* | 9/2008 | Erdler et al. | 382/255 |
| 2009/0316009 A1 | 12/2009 | Ito et al. | |

FOREIGN PATENT DOCUMENTS

| | | |
|---|---|---|
| GB | 2280812 A | 2/1995 |
| JP | 2002-16820 A | 1/2002 |
| JP | 3251127 B2 | 1/2002 |
| JP | 4666012 B2 | 4/2011 |

* cited by examiner

*Primary Examiner* — Sherrie Hsia
(74) *Attorney, Agent, or Firm* — Birch, Stewart, Kolasch & Birch, LLP

(57) ABSTRACT

Motion blur at a pixel of interest in a video signal is corrected adaptively by detecting a motion vector of the pixel of interest, estimating the direction and magnitude of the motion blur from the motion vector, and filtering the video signal at the pixel of interest. The filtering process uses the pixel values of the pixels in a neighborhood of the pixel of interest, clipped so that they do not differ too greatly from the pixel value of the pixel of interest, and low-pass filtering coefficients selected according to the estimated direction and magnitude. The filtered value is used to calculate a gain factor for correcting the pixel value of the pixel of interest. The strength of the correction is adjusted according to the difference between the pixel value of the pixel of interest and the mean pixel value in its vicinity. The adjustment and clipping prevent overcorrection.

11 Claims, 11 Drawing Sheets

FIG.11A SYI 
FIG.11B D0 
FIG.11C SYO 
FIG.11D D1 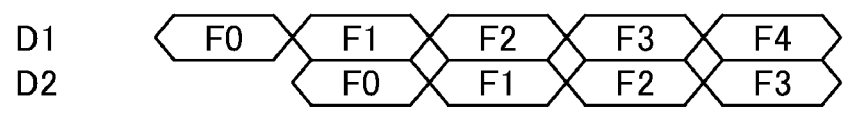
FIG.11E D2 
FIG.12
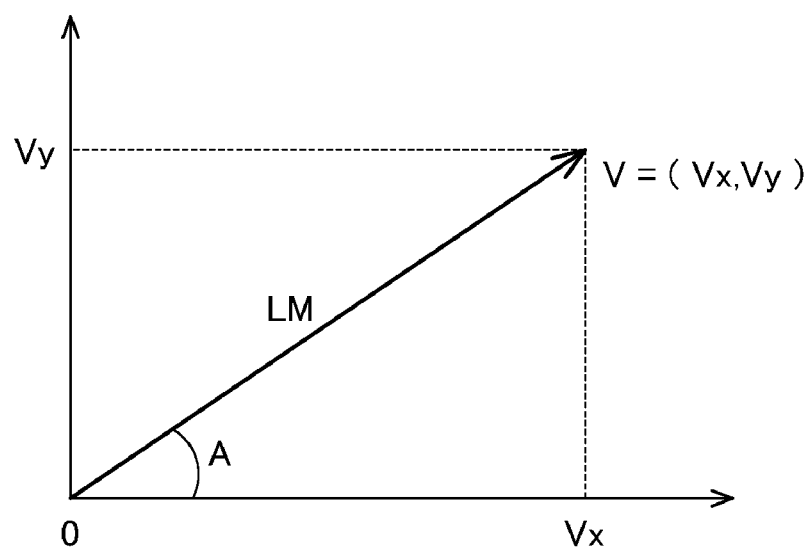

| LR | 3 | | | 5 | | | ... | 21 | | |
|---|---|---|---|---|---|---|---|---|---|---|
| AR2 | 0 | 1 | ... 11 | 0 | 1 | ... 11 | ... | 0 | 1 | ... 11 |
| IND | 0 | 1 | ... 11 | 12 | 13 | ... 23 | ... | 108 | 109 | ... 119 |

IMAGE PROCESSING DEVICE AND METHOD AND IMAGE DISPLAY DEVICE

BACKGROUND OF THE INVENTION

1. Field of the Invention

The present invention relates to an image processing device and method for correcting motion blur in a video signal, and to an image display device.

2. Description of the Related Art

Conventional CRT displays are rapidly being replaced by thinner devices such as liquid crystal display devices and plasma display devices. When liquid crystal displays were first developed, their marked inferiority to CRTs in displaying motion was regarded as a particular problem. In addition to the slow response speed of the liquid crystal, the motion blur due to the holding of each frame image on the screen for an entire frame period was a major factor.

Through improvements in liquid crystal materials, the development of the overdrive technique, and other recent advances in technology, great progress has been made in overcoming the problem of the slow response of liquid crystals. Methods of dealing with the holding issue have also been proposed, such as displaying black images between frames and interpolating subframes between frames. With progressive improvement in the motion display performance of thin display devices, there has come a growing desire to deal with motion blur present in the video signal received by the display device.

The video signal received by a display device has been obtained by integrating the image received by a camera from the subject during the frame period (for example, 1/60 second), quantizing the resulting value of each pixel, and transmitting the pixel values in a standard sequence. If there is relative motion between the subject and the light-receiving device in the camera, the outline of the subject will be blurred to a degree determined by the frame integration time and the speed of the relative motion. This type of blur is referred to below as motion blur.

In Japanese Patent Application Publication No. 2002-16820, Nishizawa proposes a deblurring method that uses a scaling circuit to control the scale of the time axis of the video signal so that the time axis becomes shorter in positions where the video signal changes greatly than in positions where the changes are more gradual. This method sharpens the rising and falling edges of image outlines by use of filtering techniques, without adding overshoot or undershoot, and is expected to be effective for isotropic blur of the type caused by poor focusing, when the blur is of narrow width. Motion blur, however, differs from focusing blur in that the amount of blur can vary greatly, depending on the relative motion between the camera and subject, and the blur is not isotropic; it occurs only in the direction of the camera-subject velocity vector. This deblurring method is not readily applicable to motion blur.

In Japanese patent No. 3251127, Dorricott et al. disclose a method that depends on deconvolution of the blur function, using motion vectors. This method fits a mathematical model to the image and carries out a filtering process with the inverse function of the blur function included in the mathematical model.

Regardless of whether the deconvolution is executed in the spatial domain or the frequency domain, however, the quality of the modified image is degraded because the video signals at the upper, lower, left, and right edges of the image differ greatly from the mathematical model. There is also considerable difference between the blur function obtained from the motion vectors and the blur function of the actual motion, and this error further degrades the quality of the modified image.

The motion blur included in a video signal differs from the isotropic blur due to focusing error etc. in that the blur length may be large or small, and the blur direction is not isotropic. For these reasons, filtering methods that apply uniform frequency conversion to the whole image do not always produce desirable results.

If the filter is optimized to correct motion blur with a long blur length, images with slowly changing luminance contours, such as lamp images and the like, will be filtered to correct nonexistent blur, and the displayed image or picture will include artifacts that should not be present.

The present invention addresses these problems with the object of detecting and reducing motion blur in a video signal without degrading displayed picture quality.

SUMMARY OF THE INVENTION

The present invention provides an image display device having:

a motion vector detection section for receiving a first video signal and a second video signal, the second video signal being equivalent to the first video signal with an advance or delay of at least one frame, and detecting therefrom a motion vector pertaining to a pixel of interest in the first video signal; and an image correction section for using the motion vector detected by the motion vector detection section to reduce motion blur in the first video signal.

The image correction section includes:

a motion blur estimator for estimating, from the motion vector, a direction and a magnitude of the motion blur;

a filtering unit for filtering the first video signal, using filter coefficients corresponding to the estimated direction and magnitude; and a correction strength adjuster for adjusting a strength of a correction applied to a pixel value of the pixel of interest, responsive to a degree of variation of pixel values in a vicinity of the pixel of interest, the degree of variation being expressed as a difference between the pixel value of the pixel of interest and the mean value of the pixel values in the vicinity.

The filtering unit performs a low-pass filtering operation, using clipped pixel values obtained by clipping pixel values of the pixels in a neighborhood of the pixel of interest so that an absolute value of the difference between the pixel value of the pixel of interest and the pixel values of the pixels in the neighborhood does not exceed a predetermined threshold.

According to the present invention, motion-blurred parts of an input video signal are detected and deblurred adaptively, so that only the blurred parts are deblurred. The deblurring reduces the length of the motion blur in the input video signal and improves the quality of the displayed video picture.

BRIEF DESCRIPTION OF THE DRAWINGS

In the attached drawings:—

FIGS. 11A to 11E form a timing diagram illustrating the operation of the image delay section 4 in FIG. 1;

FIG. 12 illustrates the components of a motion vector;

DETAILED DESCRIPTION OF THE INVENTION

First Embodiment

Figure 1:
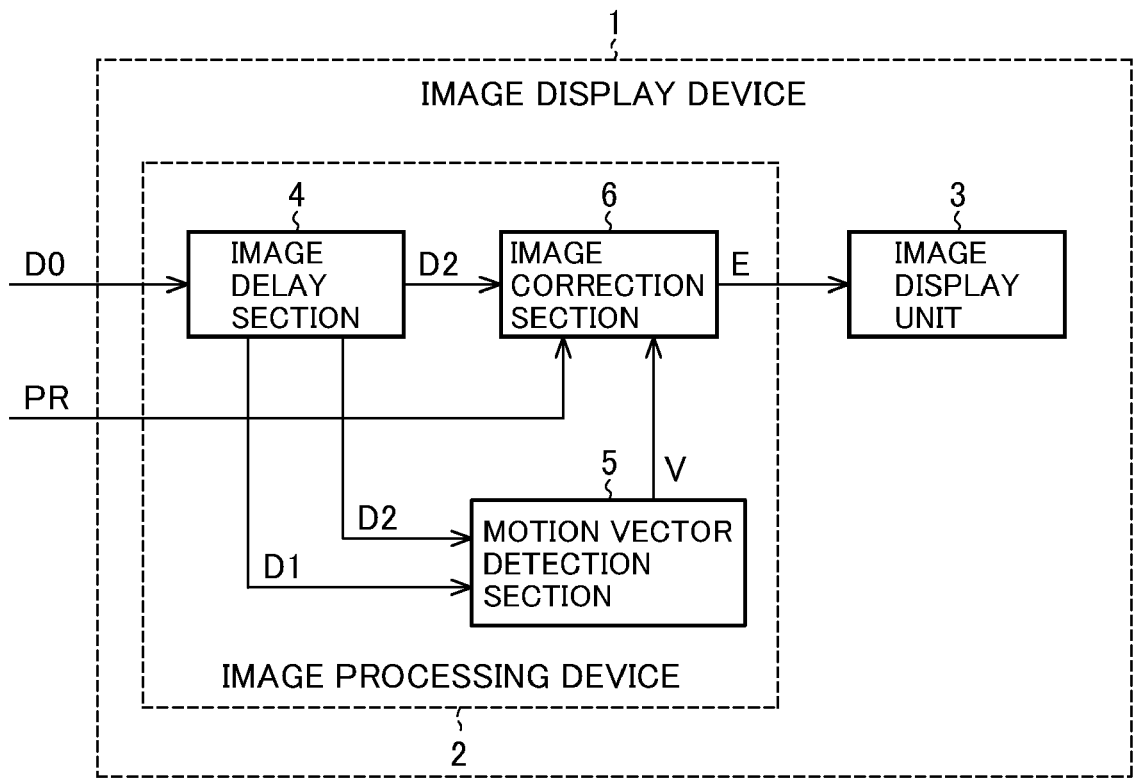
FIG. 1 is a block diagram of an image display device in a first embodiment of the invention.

FIG. 1 is a block diagram illustrating the structure of an image display device having an image processing apparatus according to the invention. The illustrated image display device 1 includes an image processing device 2 and an image display unit 3.

The image processing device 2 includes an image delay section 4, a motion vector detection section 5, and an image correction section 6.

The image processing device 2 receives an input video signal D0 and performs a deblurring process to mitigate motion blur. The video signal D0 is a stream of signals expressing pixel values of the plurality of pixels that constitute the image. In the deblurring process, the image processing device 2 takes each pixel in turn as the pixel of interest, corrects its pixel value, and outputs a deblurred video signal E (a signal stream with corrected pixel values).

The video signal D0 input to the image processing device 2 is supplied to the image delay section 4. The image delay section 4 uses a frame memory to delay the input signal and outputs video signals representing two different frames to the motion vector detection section 5.

The motion vector detection section 5 uses the video signals D1, D2 representing two different frames output by the image delay section 4 to detect motion vectors V for the pixels in video signal D2, and outputs the motion vectors V to the image correction section 6.

The image correction section 6 receives the motion vectors V from the motion vector detection section 5, corrects motion blur in parts of the video signal output from the image delay section 4 that are degraded by subject motion or camera motion, and outputs the deblurred video signal E. The image display unit 3 displays a picture based on the deblurred video signal E. The user can adjust the strength of the correction or the corrected picture quality by input of an adjustment parameter PR.

In the description below, the picture size is M pixels vertically and N pixels horizontally. Variables i and j are defined in the ranges $1 \leq i \leq M$ and $1 \leq j \leq N$, the coordinates designating the position of a pixel will be denoted (i, j), and the pixel at the position designated by these coordinates will be denoted P(i, j). Variable i accordingly represents vertical position while variable j represents horizontal position. At the position of the pixel in the top left corner of the picture i=1 and j=1; the value of i increases by one at intervals of one pixel in the downward direction; the value of j increases by one at intervals of one pixel in the rightward direction.

Figure 2:
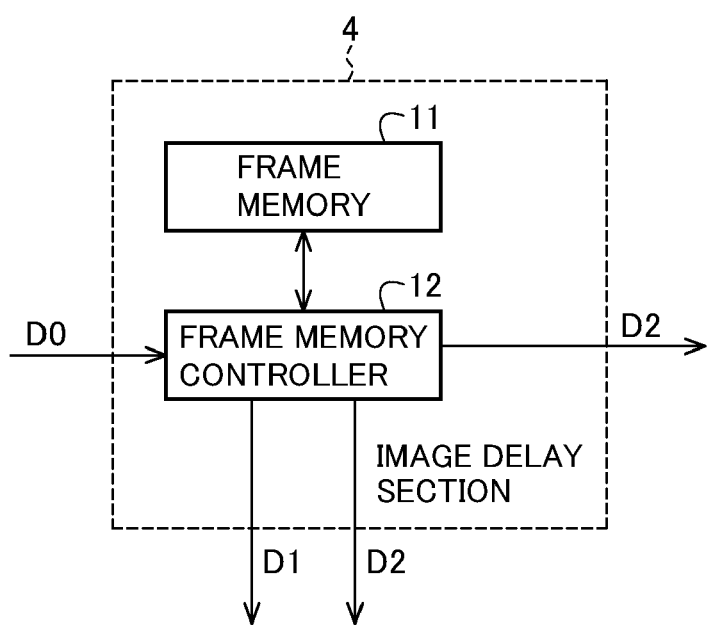
FIG. 2 is a block diagram showing an example of the structure of the image delay section in FIG. 1.

FIG. 2 shows an example of the structure of the image delay section 4. The illustrated image delay section 4 includes a frame memory 11 and a frame memory controller 12. The frame memory 11 has sufficient capacity to store at least one frame of the input video signal.

The frame memory controller 12 writes the input video signal D0 in the frame memory 11 at addresses generated from synchronizing signals included in the input video signal and reads the stored video signal from addresses likewise generated from these synchronizing signals to generate video signals D1, D2 for two consecutive frames.

Video signal D1, which is undelayed with respect to the input video signal D0, will also be referred to as the current-frame video signal.

Video signal D2, which is delayed by one frame with respect to video signal D1, will also be referred to as the one-frame-delayed video signal.

In the description below, when processing is carried out on video signal D2, video signal D2 may be referred to as the frame-of-interest video signal and video signal D1 may be referred to as the following-frame video signal. The video signals D1, D2 are streams of signal values of the pixels constituting the picture; the pixel value of the pixel P(i, j) at coordinates (i, j) will be denoted D1(i, j) or D2(i, j).

Figure 3:
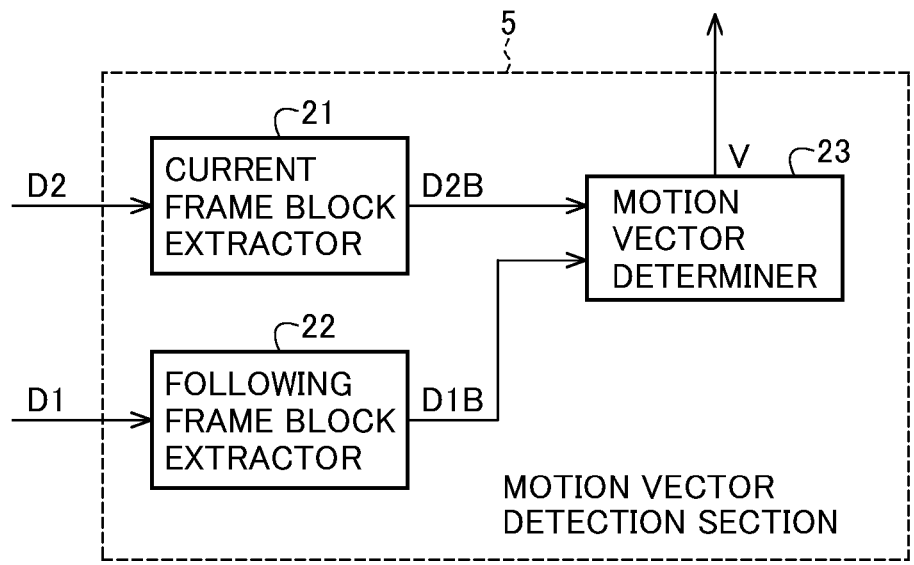
FIG. 3 is a block diagram showing an example of the structure of the motion vector detection section in FIG. 1.
Figure 4A:
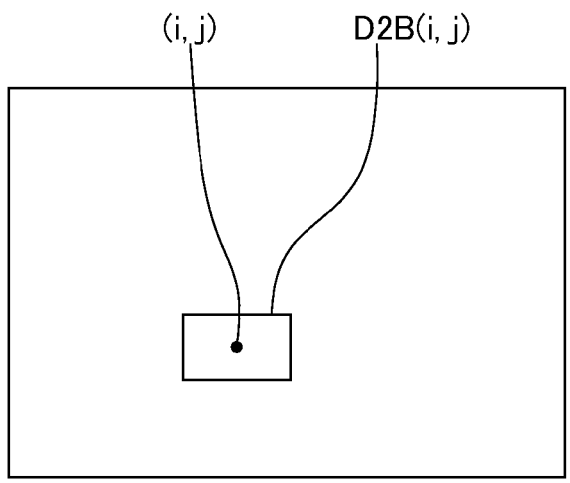
FIGS. 4A and 4B show an example of a motion vector search range in two consecutive frames of a video signal.

An example of the structure of the motion vector detection section 5 is shown in FIG. 3. The illustrated motion vector detection section 5 includes a current frame block extractor 21, a following frame block extractor 22, and a motion vector determiner 23. From the frame-of-interest video signal D2 output from the image delay section 4, the current frame block extractor 21 extracts an area around the pixel of interest P(i, j), for example, a rectangular area or block D2B(i, j) of vertical size or height (2*BM+1) and horizontal size or width (2*BN+1) as shown in FIG. 4A. The motion vector detection section 5 estimates the area to which this rectangular area D2B(i, j) moves in the following-frame video signal D1 and outputs the position of the estimated area relative to the rectangular area D2B(i, j) as the motion vector V of the pixel of interest P(i, j). This motion vector may be denoted V(i, j) to distinguish it from the motion vectors of other pixels.

Figure 4B:
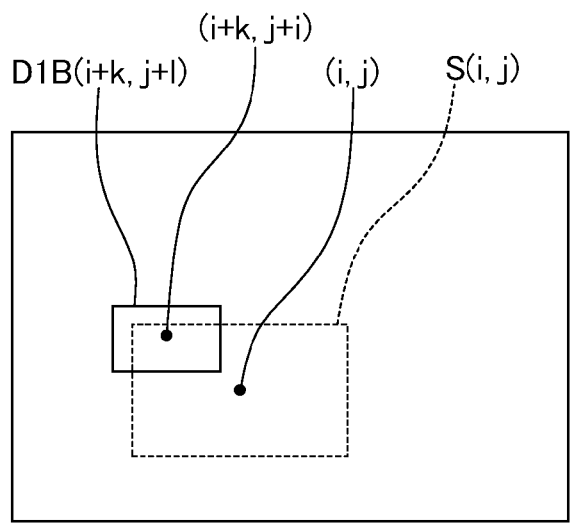

Referring to FIG. 4B, from the video signal D1 output from the image delay section 4, the following frame block extractor 22 extracts a rectangular area D1B(i+k, j+l), of the same size as rectangular area D2B(i, j), centered at each position (i+k, j+l) included in a set S(i, j) of coordinates defined as:

$$S(i, j) = \{(i+k, j+l)\} \tag{1}$$

where $-SV \leq k \leq SV$ and $-SH \leq l \leq SH$ for prescribed values SV and SH.

The set S(i, j) is referred to as the motion vector search range of the pixel of interest P(i, j). The search range defined in this way is a rectangular area with a horizontal width of 2*SH+1 and a vertical height of 2*SV+1.

The motion vector determiner 23 calculates a sum of the absolute values of the differences between the values of all the pixels, i.e., the (2*BM+1)*(2*BN+1) pixels disposed in each rectangular area D2B(i, j) input from the current frame block extractor 21 and the values of the pixels in the corresponding positions in each block D1B(i+k, j+l) input from the following frame block extractor 22. The calculation of this sum of absolute differences SAD(i+k, j+l) is expressed by the following equation (2).

$$SAD(i+k, j+l) = \sum_{r=-BM}^{BM} \sum_{s=-BN}^{BN} |D1(i+k+r, j+l+s) - D2(i+r, j+s)| \quad (2)$$

The motion vector determiner 23 therefore calculates a total of (2*SV+1)*(2*SH+1) sums of absolute differences SAD(i+k, j+l), one for each of the (2*SV+1)*(2*SH+1) rectangular areas D1B(i+k, j+l), and finds a rectangular area D1B(i+km, j+lm) from which a minimum sum of absolute differences is obtained. The position (km, lm) of this rectangular area relative to rectangular area D2B(i, j) is output to the image correction section 6 as the motion vector V, where V=(Vx, Vy)=(km, lm).

The above motion vector detection process is carried out for all pixels in the video signal D2 output from the image delay section 4 to detect a motion vector for each pixel, and the motion vectors thus obtained are used to mitigate motion blur.

In the detection of motion vectors in the motion vector detection section 5, when pixels disposed outside the upper, lower, left, and right edges of the picture form part of the above rectangular areas D1B(i+k, j+l), D2B(i, j), making it necessary to use the values of these pixels, they can be processed by assigning to them the values of the pixels disposed on the upper, lower, left, and right edges, respectively. This technique can also be used in the calculations performed in the filtering unit 34 and mean value calculator 37 that will be described later.

The processing method used in the motion vector detection section 5 in this invention is not limited to the method described above. Among the other possible methods are methods that calculate motion vectors by using the preceding-frame video signal in addition to the current-frame and following-frame video signals, by using the current-frame and preceding-frame video signals without using the following-frame video signal, or by using the current-frame and following-frame video signals and a phase correlation function.

Figure 5:
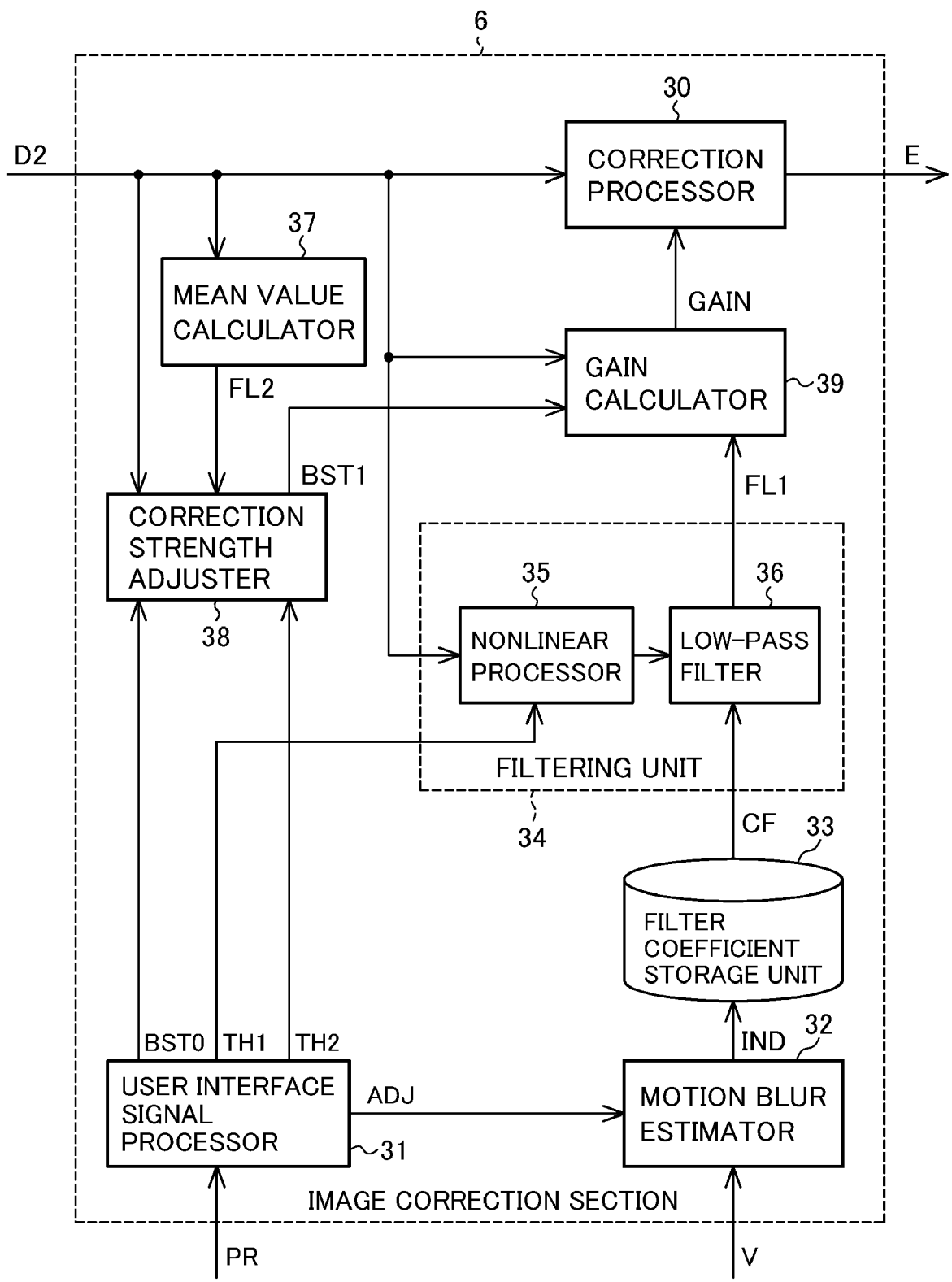
FIG. 5 is a block diagram showing an example of the structure of the image correction section in FIG. 1.

An example of the structure of the image correction section 6 is shown in FIG. 5. The illustrated image correction section 6 includes a user interface signal processor 31, a motion blur estimator 32, a filter coefficient storage unit 33, a filtering unit 34, a mean value calculator 37, a correction strength adjuster 38, and a gain calculator 39.

The correction processor 30 receives video signal D2, modifies the pixel value of each pixel according to a gain described below, and outputs the modified video signal E to the image display unit 3.

The user interface signal processor 31 analyzes a signal PR input by the user through an interface not shown in the drawings, and outputs parameters obtained from the analysis. The parameters output from the user interface signal processor 31 include an adjustment parameter ADJ, a correction strength parameter BST0, and thresholds TH1, TH2.

The adjustment parameter ADJ is supplied to the motion blur estimator 32 for use in calculating the amount of motion blur from the motion vectors.

Threshold TH1 is output to the filtering unit 34 for use in adjusting the filtering characteristic of the filtering unit 34.

The correction strength parameter BST0 is output to the correction strength adjuster 38 for use in determining the strength of the correction. Threshold TH2 is output to the correction strength adjuster 38 for use in detecting a feature of the image, e.g., for distinguishing 'flat' points that resemble their surrounding vicinity, i.e., where variation in the pixel value from the neighboring pixels is small.

The motion blur estimator 32 receives each motion vector V (having a vertical component Vy (=km) and a horizontal component Vx (=lm)) output from the motion vector detection section 5 and calculates the components (magnitude and angle) of the motion vector when expressed in polar coordinates. Specifically, the direction or angle A (in degrees) and magnitude or length LM (in pixels) are calculated by the following equations, zero degrees indicating the direction of a motion vector that points horizontally to the right.

$$A = (\arctan(Vy/Vx)) * 180/\pi \quad (3)$$

$$LM = \sqrt{Vy^2 + Vx^2} \quad (4)$$

The motion blur estimator 32 also calculates the angle and magnitude of the motion blur corresponding to the motion vector. For example, the angle of the motion blur may be identical to the angle of the motion vector, and the magnitude LB of the motion blur may equal to the magnitude LM of the motion vector multiplied by the adjustment parameter ADJ (0<ADJ≦1), in which case the magnitude LB of the motion blur is calculated by the following equation (5).

$$LB = LM * ADJ \quad (5)$$

Figure 6:
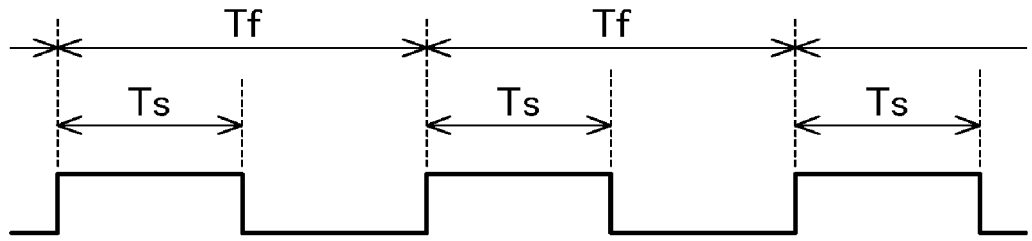
FIG. 6 shows the relation between frame period and imaging period.

Referring to FIG. 6, the adjustment parameter ADJ has a value equivalent to the ratio (Ts/Tf) of the length Ts of the imaging period, for example the charge accumulation time, to the length Tf of the frame period. The value of this parameter ADJ may be varied according to the actual imaging period of each frame, or it may be determined from a typical value, mean value, or mid-range value of the imaging period under the conditions of use of the present invention. When the mid-range value is used, for example, if the imaging period can range from EXS to EXL times the frame period (where EXS and EXL are both less than unity) the middle value (EXS+EXL)/2 of this range may be used as the value of ADJ.

The reason for multiplying by the adjustment parameter ADJ is that while the motion vector V is detected from frame to frame and represents the amount of motion over the frame period, motion blur is due to the motion of the subject during the imaging period.

The filter coefficient storage unit 33 has a plurality of sets of low-pass filter coefficients (two-dimensional finite impulse response filter coefficients) corresponding to a plurality of combinations of motion blur directions and magnitudes, pre-stored in a table format. The purpose of these filter coefficients is to reduce the motion blur component in a video signal including motion blur with a particular direction and magnitude.

From the motion blur direction A and magnitude LB calculated as described above, the motion blur estimator 32 calculates a pointer IND to the table in order to read the filter coefficients corresponding to the calculated motion blur direction A and magnitude LB from the table, and inputs the pointer IND to the filter coefficient storage unit 33.

The filter coefficient storage unit 33 reads the filter coefficients CF(p, q) stored in correspondence to the input pointer IND, and outputs them to the filtering unit 34.

The filtering unit 34 uses the filter coefficients CF(p, q) read from the filter coefficient storage unit 33 (where −P≦p≦P and −Q≦q≦Q) and the pixel values of the pixels in the corresponding neighborhood of the pixel of interest D2(i, j) in video signal D2 to perform filtering, and outputs the filtered value FL1(i, j). The filtering unit 34 includes a nonlinear processor 35 and a low-pass filter 36.

The nonlinear processor 35 performs the nonlinear processing indicated by the equations (6a) to (6f) below, based on the threshold TH1 input from the user interface signal processor 31 and the difference between the pixel value D2(i, j) of the pixel of interest and the pixel values D2(i−p, j−q) of the pixels in the neighborhood of the pixel of interest, to obtain respective values D2b(i−p, j−q) such that:

(A) If $D2(i-p, j-q)-D2(i, j) > TH1$ then $D2b(i-p, j-q)-D2(i, j) = TH1$ (6a)

thus $D2b(i-p, j-q) = D2(i, j) + TH1$ (6a)

(B) If $D2(i-p, j-q)-D2(i, j) < -TH1$ then $D2b(i-p, j-q)-D2(i, j) = -TH1$ (6c)

thus $D2b(i-p, j-q) = D2(i, j) - TH1$ (6d)

(C) If other than (A) and (B)

then $D2b(i-p, j-q)-D2(i, j) = D2(i-p, j-q) - D2(i, j)$ (6e)

thus $D2b(i-p, j-q) = D2(i-p, j-q)$ (6f)

The low-pass filter 36 multiplies the values D2b(i−p, j−q) obtained from the above nonlinear process, within the area neighboring the pixel of interest P(i, j), i.e., the area including (2*P+1)*(2*Q+1) pixels centered on the pixel of interest P(i, j), by the corresponding coefficients CF(p, q), and takes the sum of the resulting products as the filtered value FL1(i, j).

The coefficients CF(p, q) used by the low-pass filter 36 will now be described.

The filter coefficients are defined in a range centered on the pixel of interest, satisfying −P≦p≦P, −Q≦q≦Q.

As stated above, different sets of filter coefficients CF(p, q) are used, depending on the angle A and magnitude LB of the motion blur.

Figure 7:
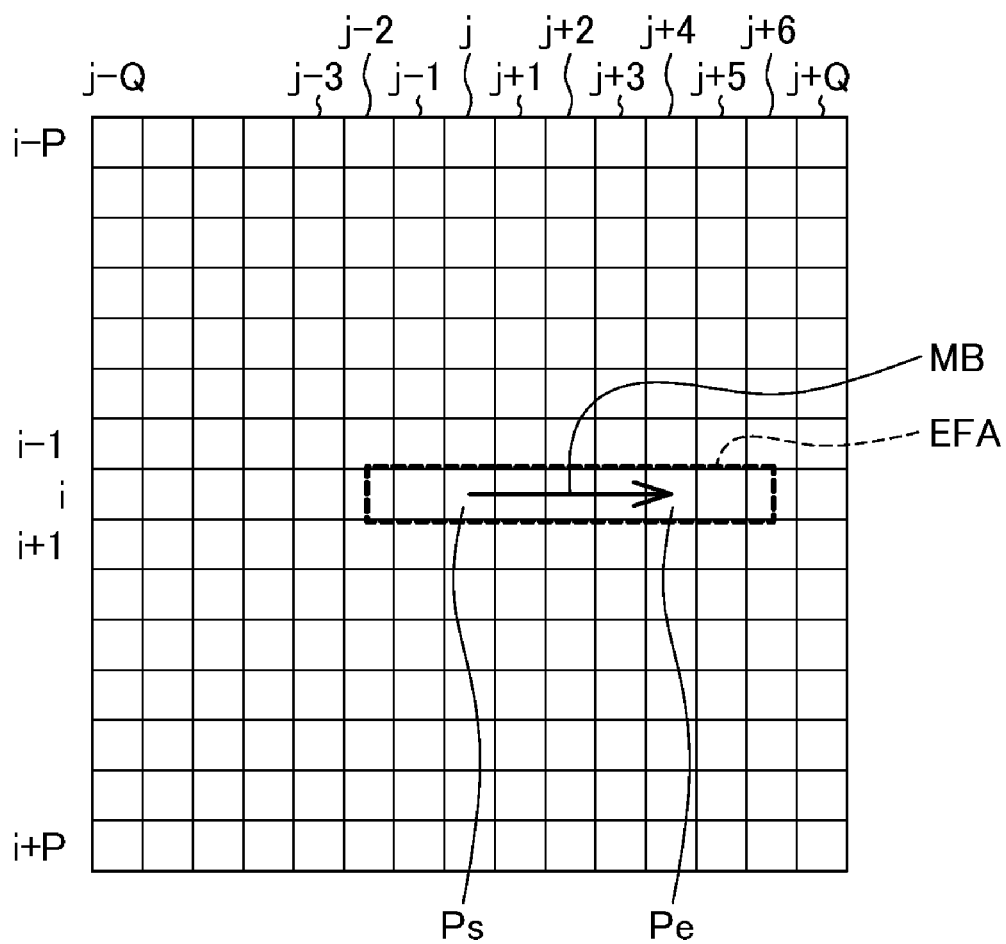
FIGS. 7, 8, and 9 show examples of effective filtering areas with respect to motion blur.
Figure 8:
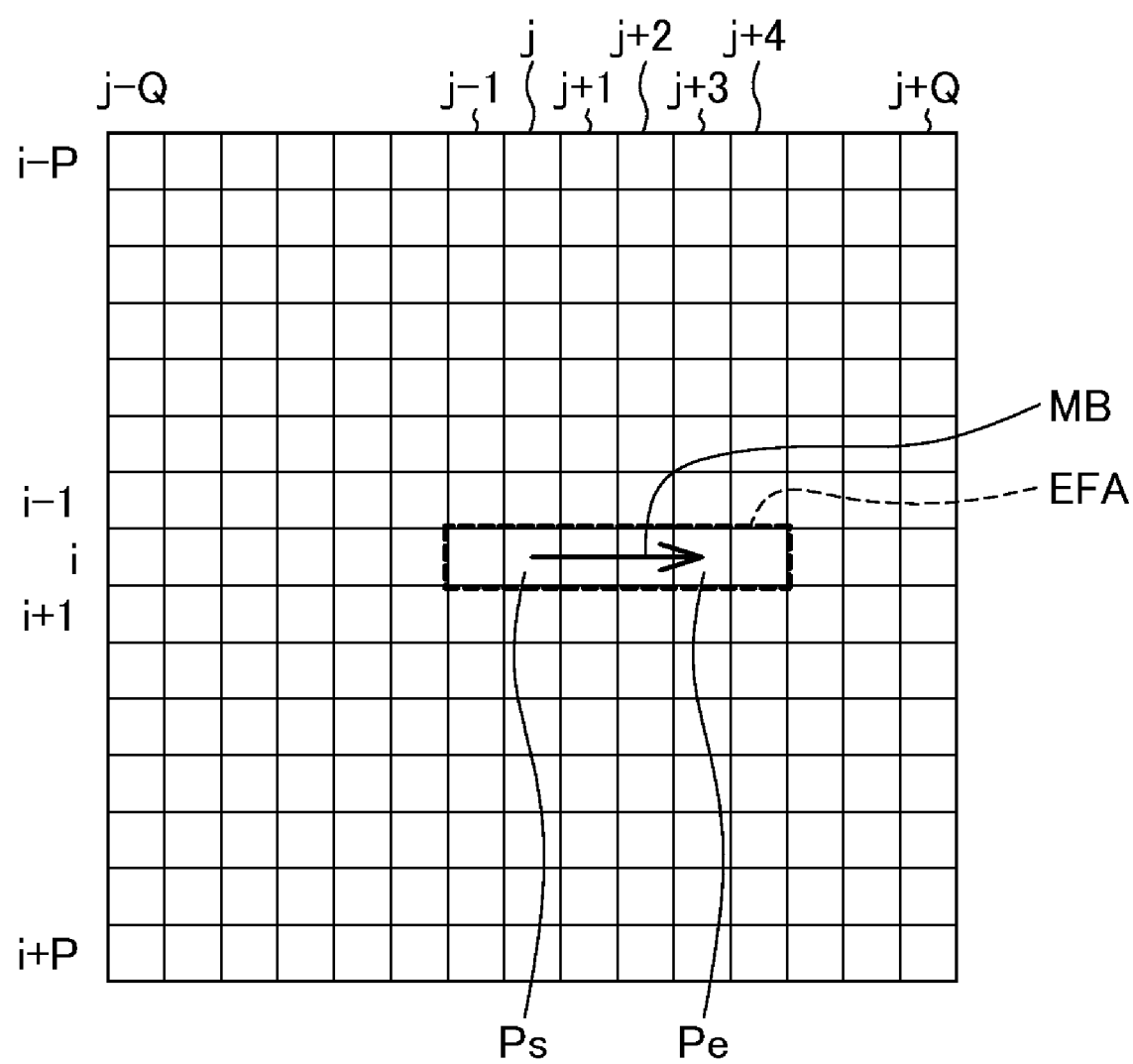
Figure 9:
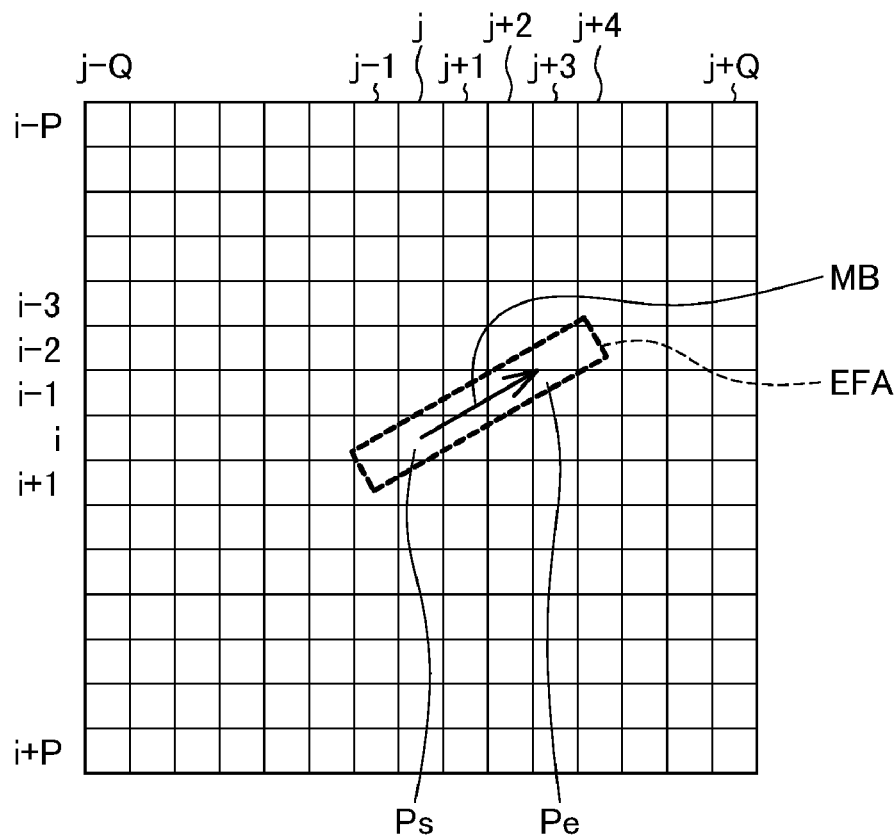

Within the range in which the filter coefficients are defined, FIGS. 7 to 9 show areas in which nonzero filter coefficients are defined for several examples of motion blur. The area in which the filter coefficients take nonzero values will be referred to as the effective filtering area EFA. The sum of the filter coefficients at pixel positions in the effective filtering area EFA is unity.

The effective filtering area EFA is a band-shaped area with an orientation and length that depend on the angle A and magnitude LB of the motion blur. Pixels that lie partially or completely within the effective filtering area EFA may be weighted according to the degree to which the pixels are included in the effective filtering area EFA. A pixel that is only partially included in the effective filtering area EFA, for example, has a smaller weighting coefficient than a pixel that is wholly or completely included in the effective filtering area EFA. The value of each weighting coefficient is proportional to the fraction of the pixel that is included in the effective filtering area EFA.

The band-shaped area extends in the direction of the motion blur and its length is a predetermined multiple of the magnitude LB of the motion blur. For example, its length may be twice LB, extending 0.5LB beyond the starting point and ending point of the motion blur. The width of the band-shaped area is equivalent to the size of one pixel. In the examples in FIGS. 7 to 9, the pixel size is the same in the horizontal and vertical directions, and the coordinates of the starting point of the motion blur are denoted (i, j).

The motion blur in the example in FIG. 7 is horizontal and has a magnitude LB equivalent to four pixels. The motion blur is regarded as starting at the center of the pixel Ps with coordinates (i, j) and ending at the center of the pixel Pe with coordinates (i, j+4). A length of two pixels (0.5×4 pixels) is added at each end to obtain the effective filtering area, which extends from the center of the pixel at coordinates (i, j−2), two pixels back (to the left in FIG. 7) from the center of the starting pixel Ps, to the center of the pixel at coordinates (i, j+6), two pixels forward (to the right in FIG. 7) of the center of the ending pixel Pe. As the pixels are weighted in proportion to their inclusion in the effective filtering area EFA, the pixels with coordinates from (i, j−1) to (i, j+5) all receive weighting coefficients with the same value, and the pixels at coordinates (i, j−2) and (i, j+6) receive weighting coefficients with half that value, since they are only half included in the effective filtering area EFA.

In the example in FIG. 7, two pixels are half included in the effective filtering area EFA and six pixels are wholly included in the effective filtering area EFA, so the pixels that are wholly included in the effective filtering area EFA receive weighting coefficients of $1/7$ and the pixels that are only half included receive weighting coefficients of $1/14$.

The motion blur in the example in FIG. 8 is horizontal and has a magnitude LB equivalent to three pixels. The motion blur is regarded as starting at the center of the pixel Ps with coordinates (i, j) and ending at the center of the pixel Pe with coordinates (i, j+3). A length of 1.5 pixels (0.5×3 pixels) is added at each end to obtain the effective filtering area, which extends from the left edge of the pixel at coordinates (i, j−1), 1.5 pixels back (to the left in FIG. 8) from the center of the starting pixel Ps, to the right edge of the pixel at coordinates (i, j+4), 1.5 pixels forward (to the right in FIG. 8) of the center of the ending pixel Pe. There are no pixels which are partially included in the effective filtering area EFA in the example in FIG. 8, so weighting coefficients of $1/6$ are assigned to each of the six pixels wholly included in the effective filtering area EFA.

The motion blur in the example in FIG. 9 has the same three-pixel magnitude LB as in FIG. 8, so the length of its effective filtering area EFA is the same as in FIG. 8, but it is oriented at an angle of thirty degrees, and there are many pixels that are only partly included in the effective filtering area EFA. Specifically, the pixels with coordinates (i−3, j+4), coordinates (i−2, j+2), coordinates (i−2, j+3), coordinates (i−2, j+4), coordinates (i−1, j), coordinates (i−1, j+1), coordinates (i−1, j+2), coordinates (i−1, j+3), coordinates (i, j−1), coordinates (i, j), coordinates (i, j+1), coordinates (i, j+2), coordinates (i+1, j−1), and coordinates (i+1, j) are partly included in the effective filtering area EFA. These fourteen pixels receive weighting coefficients proportional to their inclusion in the effective filtering area EFA.

For other values of the magnitude LB and angle A of the motion blur, weighting coefficients are assigned to the pixels in similar fashion. Weighting coefficients are not calculated, however, for all possible values of the magnitude LB and angle A of the motion blur; instead, weighting coefficients are calculated for representative values LR, AR, each representing a certain range of values of the magnitude LB or angle A, and these calculated weighting coefficients are stored in the filter coefficient storage unit 33. The weighting coefficients calculated and stored for the representative values LR, AR are used as the filter coefficients for the magnitudes LB and angles A in the corresponding ranges. The representative values LR, AR (or values corresponding thereto) are used in generating the pointer IND described below. A more detailed description will be given later.

In the examples above the effective filtering area EFA was extended by a length of 0.5 times the motion blur magnitude LB at both its starting and ending edges, but the extension may have a fixed value such as 0.5 pixel, for example, regardless of the magnitude LB of the motion blur. Alternatively, the extension may be zero.

These examples used a moving-average filter in which the pixels in the effective filtering area EFA were weighted according to the degree to which they were included in the effective filtering area EFA, without regard to their distance from the pixel of interest, but it is also possible to weight the pixels according to their distance from the pixel of interest. A Gaussian filter is an example of this type of filter.

As stated above, the low-pass filter 36 multiplies values $D2b(i-p, j-q)$ obtained as results of a nonlinear process performed on each pixel in the neighborhood of the pixel of interest $P(i, j)$ by the corresponding filter coefficients $CF(p, q)$ read from the filter coefficient storage unit 33 and calculates the sum of the resulting products to obtain the filtered value $FL1(i, j)$. This filtering process is carried out according to the following equation.

$$FL1 = \sum_{q=-Q}^{Q} \sum_{p=-P}^{P} CF(p, q) D2b(i-p, j-q) \quad (7)$$

The filtered value $FL1(i, j)$ obtained from this equation (7) is output to the gain calculator 39.

The mean value calculator 37 outputs the mean value $FL2(i, j)$ of the pixel values of the pixels in a vicinity of the pixel of interest $P(i, j)$. The vicinity may consist of, for example, $(2*P+1)*(2*Q+1)$ pixels, and the mean value calculator 37 may calculate the mean value $FL2(i, j)$ of the pixel values $D2(i-p, j-q)$ by the following equation (8). The calculated value is output to the correction strength adjuster 38.

$$FL2 = \sum_{q=-Q}^{Q} \sum_{p=-P}^{P} D2(i-p, j-q) \quad (8)$$

The correction strength adjuster 38 sends to the gain calculator 39 an adjusted correction strength parameter BST1 based on the correction strength parameter BST0 input from the user interface signal processor 31. When the absolute value of the difference between the pixel value $D2(i, j)$ of the pixel of interest in the video signal D2 input from the image delay section 4 and the mean value $FL2(i, j)$ input from the mean value calculator 37 is less than the threshold TH2 input from the user interface signal processor 31, the correction strength adjuster 38 generates an adjusted correction strength parameter $BST1(i, j)$ smaller than the correction strength parameter BST0 input from the user interface signal processor 31. For example, $BST0 \times \beta$, where $\beta$ is less than unity ($\beta < 1$), may be used as the adjusted correction strength parameter $BST1(i, j)$. The user may be permitted to decide how much smaller than the correction strength parameter BST0 the adjusted correction strength parameter $BST1(i, j)$ should be, by selecting the value of $\beta$, for example. Values of one-half or zero ($\beta = \frac{1}{2}$, $\beta = 0$), for example, may be selected.

Figure 10:
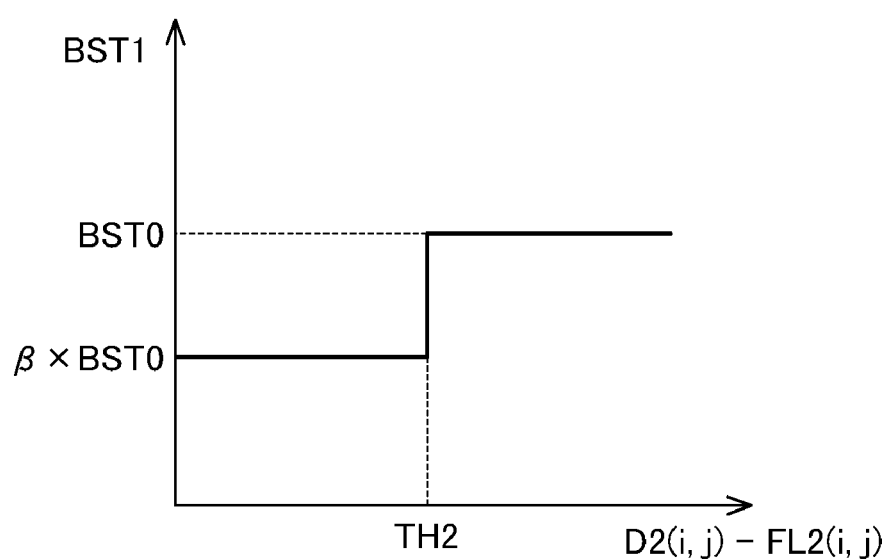
FIG. 10 shows an example of the relation between the adjusted correction strength parameter and the difference between the pixel value of a pixel and the mean pixel value in its vicinity.

When the absolute value of the difference between the pixel value $D2(i, j)$ and the mean value $FL2(i, j)$ is not less than the threshold TH2, the correction strength parameter BST0 itself is output as the adjusted correction strength parameter $BST1(i, j)$. Accordingly, the adjusted correction strength parameter $BST1(i, j)$ is related to the difference $(D2(i, j)-FL2(i, j))$ as shown in FIG. 10.

The gain calculator 39 calculates a multiplier coefficient or gain, denoted $GAIN(i, j)$ below, from the following equation, referring to the result $FL1(i, j)$ received from the filtering unit 34, the adjusted correction strength parameter $BST1(i, j)$ output from the correction strength adjuster 38, and the pixel value $D2(i, j)$ of the pixel of interest in the video signal D2 input from the image delay section 4.

$$GAIN(i, j) = 1 + BST1(i, j) - BST1(i, j) * FL1(i, j) / D2(i, j) \quad (9)$$

When $D2(i, j)$ is zero, the above calculation is carried out by setting $D2(i, j)$ equal to unity ($D2(i, j)=1$). When the gain resulting from the calculation is less than zero ($GAIN(i, j)<0$), the gain is set equal to zero ($GAIN(i, j)=0$). The gain value $GAIN(i, j)$ thus obtained is output to the correction processor 30.

The correction processor 30 performs the following calculation to obtain a pixel value $E(i, j)$ from the pixel value $D2(i, j)$ of the pixel of interest $P(i, j)$ in the video signal D2 input from the image delay section 4, and outputs $E(i, j)$ to the image display unit 3 as the pixel value of pixel $P(i, j)$ in the corrected video signal.

$$E(i, j) = GAIN(i, j) * D2(i, j) \quad (10)$$

The present invention permits motion blur arising in a picture that is degraded by motion of the subject or motion of the camera to be corrected by having the image delay section 4, motion vector detection section 5, and image correction section 6 process only the luminance signal (Y). It is also possible, however, to process the red signal (R), blue signal (B), and green signal (G) separately instead of processing just the luminance signal (Y). It is furthermore possible to obtain the gain value $GAIN(i, j)$ for the sum of R, G, and B and then process R, G, and B separately by equation (10) in the image correction section 6. Alternatively, the luminance signal (Y) and color difference signals (Cb, Cr) may be processed separately. The gain value $GAIN(i, j)$ may be calculated from the luminance signal (Y) and then used to process the luminance signal (Y) and each of the color difference signals (Cb, Cr) separately by the calculation in equation (10). Similar processing may also be carried out in other color representation formats.

The operation of the component elements of the image processing device 2 will now be described in further detail.

The video signal D0 input to the image delay section 4 in the image processing device 2 and the video signals D1, D2 output from the image delay section 4 are related as shown in FIGS. 11A to 11E. The input video signal D0 is input as a sequence of frames F0, F1, F2, F3, F4, shown in FIG. 11B, which are synchronized with an input vertical synchronization signal SYI shown in FIG. 11A.

On the basis of the input vertical synchronizing signal SYI, the frame memory controller 12 generates frame memory write addresses and stores the input video signal D0 in the frame memory 11. The frame memory controller 12 also outputs video signal D1 in synchronization with an output vertical synchronizing signal SYO, shown in FIG. 11C as being undelayed with respect to the input vertical synchronizing signal SYI. Video signal D1 (frames F0, F1, F2, F3, F4) is thus output as shown in FIG. 11D, with no frame delay with respect to the input video signal D0.

On the basis of the output vertical synchronizing signal SYO, the frame memory controller 12 also generates frame memory read addresses and reads and outputs the one-frame-delayed video signal D2 stored in the frame memory 11, as shown in FIG. 11E.

As a result, the image delay section 4 simultaneously outputs video signals D1, D2 for two consecutive frames. During the time (frame period) when frame F1 of the video signal is input as video signal D0, frames F1 and F0 of the video signal are output as video signals D1 and D2, and during the time (frame period) when frame F2 of the video signal is input as video signal D0, frames F2 and F1 of the video signal are output as video signals D1 and D2.

The video signals D1, D2 for two consecutive frames output from the image delay section 4 are supplied to the motion vector detection section 5, and video signal D2 is also supplied to the image correction section 6. In the motion vector detection section 5, video signal D1 is input to the following frame block extractor 22 and video signal D2 is input to the current frame block extractor 21.

The motion vector detection section 5 detects motion vectors by use of the sum of absolute differences (SAD) that is often used in video encoding. In the present invention, a sum of absolute differences SAD is calculated for each pixel, for the purpose of mitigating motion blur in pixels in which motion blur occurs, and motion vectors are found from the minimum SAD values.

A prodigious amount of computation, however, would be required to execute the SAD calculation for every pixel, so as in video encoding, motion vectors may be calculated by the SAD method for pixels at the centers of non-overlapping blocks, and motion vectors for other pixels may be obtained by interpolation from the motion vectors of pixels nearby.

In the description above, the motion vector detection section 5 used rectangular blocks extending equally above and below and equally to the left and right of the pixel of interest $P(i, j)$, the height and width of these blocks being odd numbers expressed as $(2*BM+1)$ and $(2*BN+1)$, but the height and width of the blocks need not necessarily be odd and the pixel of interest may be slightly offset from the center of its block.

The search range was defined in equation (1) as $-SV \leq k \leq SV$ and $-SH \leq l \leq SH$, with the SAD calculation being carried out for all values of k and l included in this range, but to reduce the computational load, the SAD calculation may be carried out on a suitable subset of values of k and l. For positions $(i+k, j+l)$ at which the SAD calculation is not carried out, a sum of absolute differences $SAD(i+k, j+l)$ may be obtained by interpolation from neighboring positions. Alternatively, motion vectors may be estimated from the subset of SAD values, if evaluation of motion vector accuracy shows that this will not lead to inaccuracy problems.

A motion vector V input to the motion blur estimator 32 in the image correction section 6 has a vertical component $Vy(i, j)$ and a horizontal component $Vx(i, j)$ as shown in FIG. 12, from which the direction A of the motion vector is calculated (in degrees) by equation (3) and the magnitude LM of the motion vector is calculated (in pixels) by equation (4).

Figure 13A:
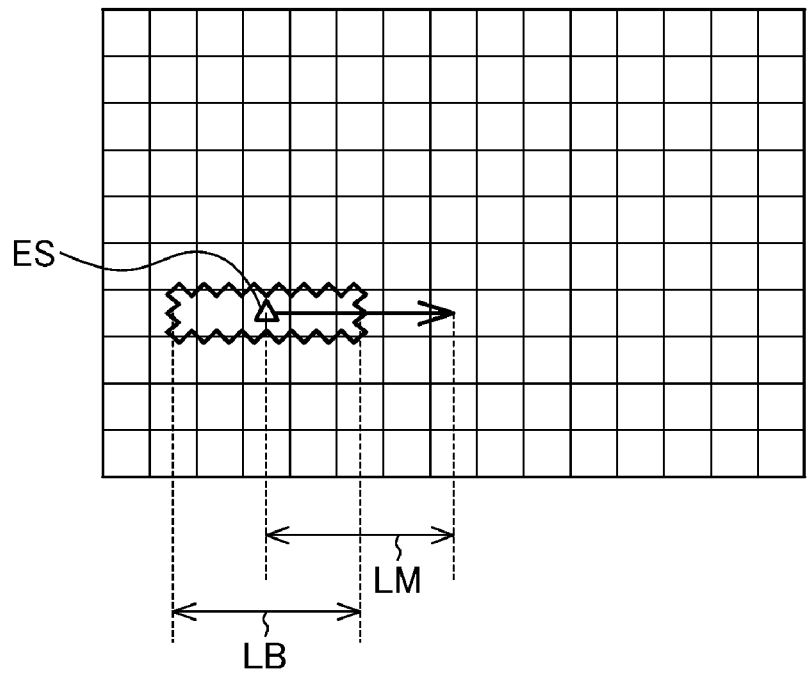
FIGS. 13A and 13B show an example of motion vectors and motion blur in two frames.
Figure 13B:
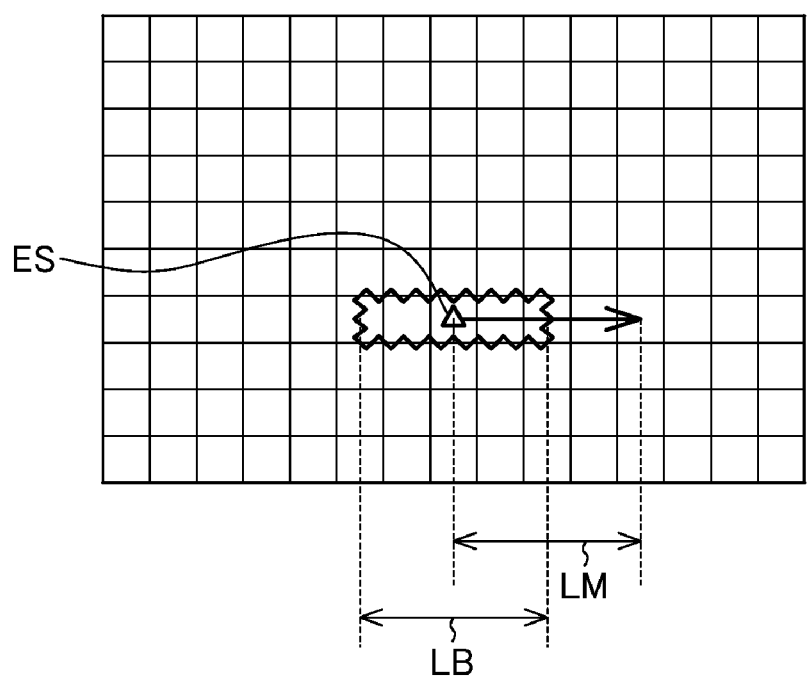
Figure 14A:
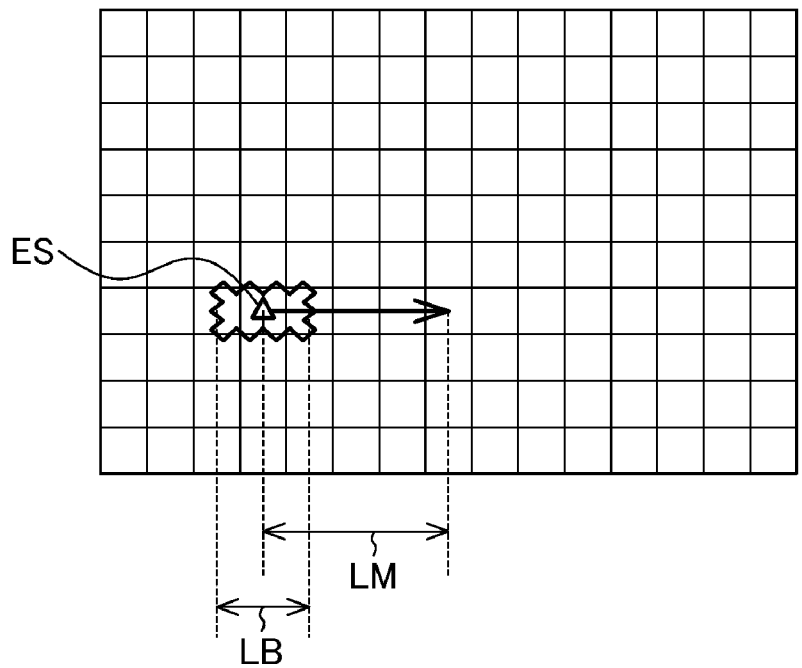
FIGS. 14A and 14B show another example of motion vectors and motion blur in two frames.
Figure 14B:
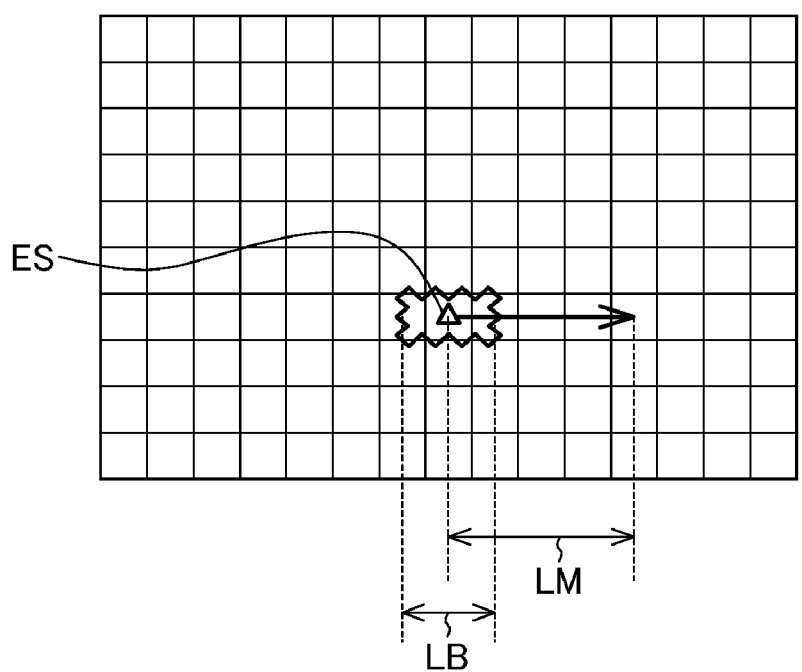

Consider a video image of a subject moving at a constant linear velocity, taken by a stationary camera. FIGS. 13A and 13B show an example of the motion of an element of the image over three consecutive frames. The image element ES moves horizontally by four pixels without moving vertically (VX=4, Vy=0) between the first and second frames, as shown in FIG. 13A, and between the second and third frames, as shown in FIG. 13B. The motion vector detected for this image element in the first frame therefore has a horizontal length of four pixels and a vertical length of zero pixels, as indicated by the arrow in FIG. 13A.

If the imaging period Ts of the video image in FIGS. 13A and 13B were equal to the frame period Tf, the magnitude LB of the motion blur would be four pixels horizontally and zero pixels vertically.

As illustrated in FIG. 6, however, the actual imaging period Ts is shorter than the frame period Tf, so the magnitude LB of the motion blur is smaller than the magnitude LM of the motion vector by a factor equivalent to the ratio (Ts/Tf) of the imaging period Ts to the frame period Tf.

To allow for this, the magnitude LB of the motion blur is estimated by multiplying the magnitude LM of the motion vector by an adjustment parameter ADJ having a value less than unity. The adjustment parameter ADJ may be determined from the actual length of the imaging period Ts of each frame, as noted above; alternatively, the adjustment parameter ADJ may be determined empirically, or selected by the user.

Next the method of calculating the pointer IND for reading the filter coefficients from the filter coefficient storage unit 33 will be described.

As an example, it will be assumed that filter coefficients are stored in the filter coefficient storage unit 33 for representative angles with values (measured in degrees) from 0 to 165, defined at intervals of 15 degrees, and for representative magnitudes defined with odd values from 1 to 21.

The magnitude LB obtained from equation (5) is rounded off to the nearest integer, and if that integer is even, 1 is added (LB=LB+1) to obtain an odd integer. If the result is greater than 21, it is clipped to 21. The value obtained in this way is output as a representative motion blur magnitude LR. This process converts any motion blur magnitude LB lying within a certain range including representative value LR to the representative value LR itself.

If the angle A obtained from equation (3) is less than zero, it is increased by 180 degrees (A=A+180). An integer A2 equal to the integer part of (A+7.5)/15 is then calculated, corresponding to the angle A rounded off to the nearest integer multiple of 15 degrees. If the result is twelve or greater (A2≧12), A2 is set equal to zero. The result of this process is output as a value AR2 corresponding to a representative motion blur angle value AR, where AR and AR2 are related as follows:

$$AR = 15*AR2$$

This process converts any motion blur angle A lying within a certain range including the representative value AR to a value AR2 corresponding to the representative value AR. The pointer IND for reading from the table is calculated from the representative motion blur magnitude LR and the value AR2 corresponding to the representative motion blur angle AR by the following equation:

$$IND = 12*((LR-1)/2-1)+AR2 \quad (11)$$

Figures 15, 16:
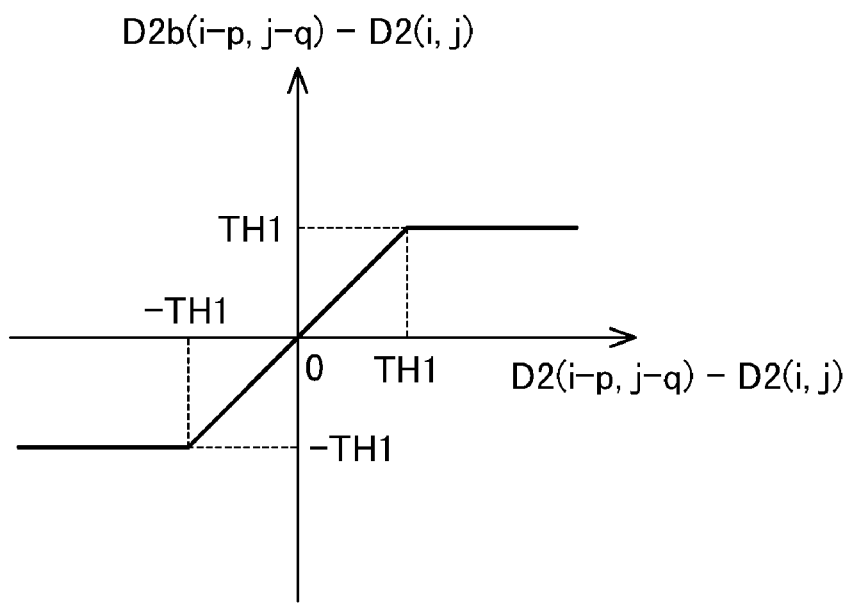
FIG. 15 shows an example of motion vector directions and magnitudes and pointers (IND) to the filter coefficient table.
FIG. 16 is a graph illustrating nonlinear processing using a threshold value.

FIG. 15 shows a specific example of the organization of a table indexed by a pointer IND calculated from AR2 and LR as in equation (11).

The filter coefficients $CF(p, q)$ for LR=1 (not shown in FIG. 15) may be such that
  if i=0, j=0, then $CF(i, j)=1$,
  otherwise, $CF(i, j)=0$,
with the result that $E(i, j)=D2(i, j)$.

Upon input of the pointer IND from the motion blur estimator 32, the filter coefficient storage unit 33 supplies the filter coefficients $CF(p, q)$ corresponding to the input pointer IND to the low-pass filter 36. The sets of filter coefficients stored in the filter coefficient storage unit 33 may be designed by the user. A feature of the present invention is that the filter coefficients are easy to design because they only have to implement a low-pass filtering process.

A more detailed description will now be given of the filtering unit 34 including the low-pass filter 36. The corrections made by the present invention to mitigate motion blur in an area in which motion blur occurs due to motion of the subject or camera are based on a low-pass filtering process and the following equation:

$$E(i,j) = D2(i,j) + BST1(i,j)*(D2(i,j) - FL1(i,j)) \quad (12)$$

Equations (9) and (10) are obtained by rewriting equation (12) in a different form. The advantage of basing the correction on equation (12) is that $GAIN(i, j)$ can be calculated by equation (9) from the green signal (G), for example, and the same $GAIN(i, j)$ can then be applied by the correction processor 30 to a plurality of color signals for the same pixel, thereby reducing the computational load. Methods that use equation (12) also have a disadvantage, however; the disadvantage and a method of overcoming it will be described below.

Methods using equation (12) perform low-pass filtering on the video signal D2 input to the image correction section 6, using the filter coefficients CF(p, q) output from the filter coefficient storage unit 33, and output the result of filtering to the gain calculator 39. The blur correction using the low-pass filtering based on equation (12), however, may cause overshoot at strong edges, in the corrected image.

The nonlinear processor 35 is therefore inserted as a prestage to the low-pass filter 36 to perform a nonlinear process that suppresses overshoot at strong edges. For example, overshoot may be suppressed by using the threshold TH1 input from the user interface signal processor 31 to carry out nonlinear processing. Specifically, the difference $D1F(i-p, j-q)$ between the pixel value $D2(i, j)$ of the pixel of interest and the pixel value $D2(i-p, j-q)$ of a pixel in the neighborhood of the pixel of interest, given by $(D1F(i-p, j-q) = D2(i, j) - D2(i-p, j-q))$ is clipped at the threshold TH1 as shown in FIG. 16. This clipping process gives proper control over the gain at edges with large differences $DIF(i-p, j-q)$ where, if suppression were not carried out, the gain value $GAIN(i, j)$ calculated by the gain calculator 39 would be too large.

Next the detailed operation of the correction strength adjuster 38 will be described.

The purpose of the correction strength adjuster 38 is to prevent impairment of the quality of the deblurred picture due to noise amplification effects. The correction strength adjuster 38 reduces the value of the correction strength parameter BST0 input from the user interface signal processor 31 according to image flatness, possibly reducing the value to zero, and outputs the reduced value to the gain calculator 39 as the adjusted correction strength parameter BST1.

Specifically, the correction strength adjuster 38 receives video signal D2, detects the variation in pixel values (e.g., luminance values) of pixels in a vicinity of the pixel of interest, and determines the value of the adjusted correction strength parameter BST1 from the size of the changes. The absolute value of the difference between the pixel value $D2(i, j)$ of the pixel of interest and the mean value $FL2(i, j)$ output from the mean value calculator 37 is used as an index of pixel value variation. If, for example, this absolute value is less than the threshold TH2 input from the user interface signal processor 31, the pixel value variation in the vicinity of the pixel of interest is considered to be small and the adjusted correction strength parameter BST1 is set to, for example, one half of the correction strength parameter BST0; if this absolute value is greater than the threshold TH2, the pixel value variation in the vicinity of the pixel of interest is considered to be large and the correction strength parameter BST0 is used without alteration as the adjusted correction strength parameter BST1. The adjusted correction strength parameter BST1 determined in this way is output to the gain calculator 39.

The significance of performing the above processing will now be described in further detail.

The processing carried out to mitigate motion blur in areas where motion blur occurs because of motion of the subject or camera necessarily amplifies noise in the video signal. When the motion blur occurs in a 'flat' area in which there is little pixel variation, e.g., little luminance variation, the visual effect of the motion blur is small and weak correction processing is adequate. If motion blur in such an area were to be corrected by use of the unaltered correction strength parameter BST0, the amplified noise would become prominent and the overall result of the correction would be reduced picture quality. The correction processing is therefore carried out adaptively by detecting flat areas and reducing the value of the correction strength parameter in them. To decide whether a pixel of interest lies in a flat area, the difference between the pixel value $D2(i, j)$ of the pixel of interest and the mean pixel value FL2 of the pixels in its vicinity is compared with a threshold value.

The mean value used of this purpose is the simple average of the pixel values of the pixels in the area defined by $-P \leq p \leq P, -Q \leq q \leq Q$, calculated by the mean value calculator 37 as described above.

The gain calculator 39 uses the output $FL1(i, j)$ of the filtering unit 34, the adjusted correction strength parameter BST1 output from the correction strength adjuster 38, the pixel value $D2(i, j)$ of the pixel of interest in video signal D2, and equation (9) to calculate the gain value $GAIN(i, j)$, and supplies the calculated $GAIN(i, j)$ to the correction processor 30.

Since the calculation expressed by equation (9) involves division by $D2(i, j)$, when $D2(i, j)$ is zero, the calculation is carried out by treating $D2(i, j)$ as having the lowest positive value ($D2(i, j)=1$). When $GAIN(i, j)$ is less than zero, it is clipped to zero ($GAIN(i, j)=0$). The gain value thus obtained is supplied to the correction processor 30.

The correction processor 30 corrects motion blur by multiplying the pixel value $D2(i, j)$ by the supplied gain value $GAIN(i, j)$. The resulting product is output to the image display unit 3 as a deblurred pixel value $E(i, j)$.

Second Embodiment

Figure 17:
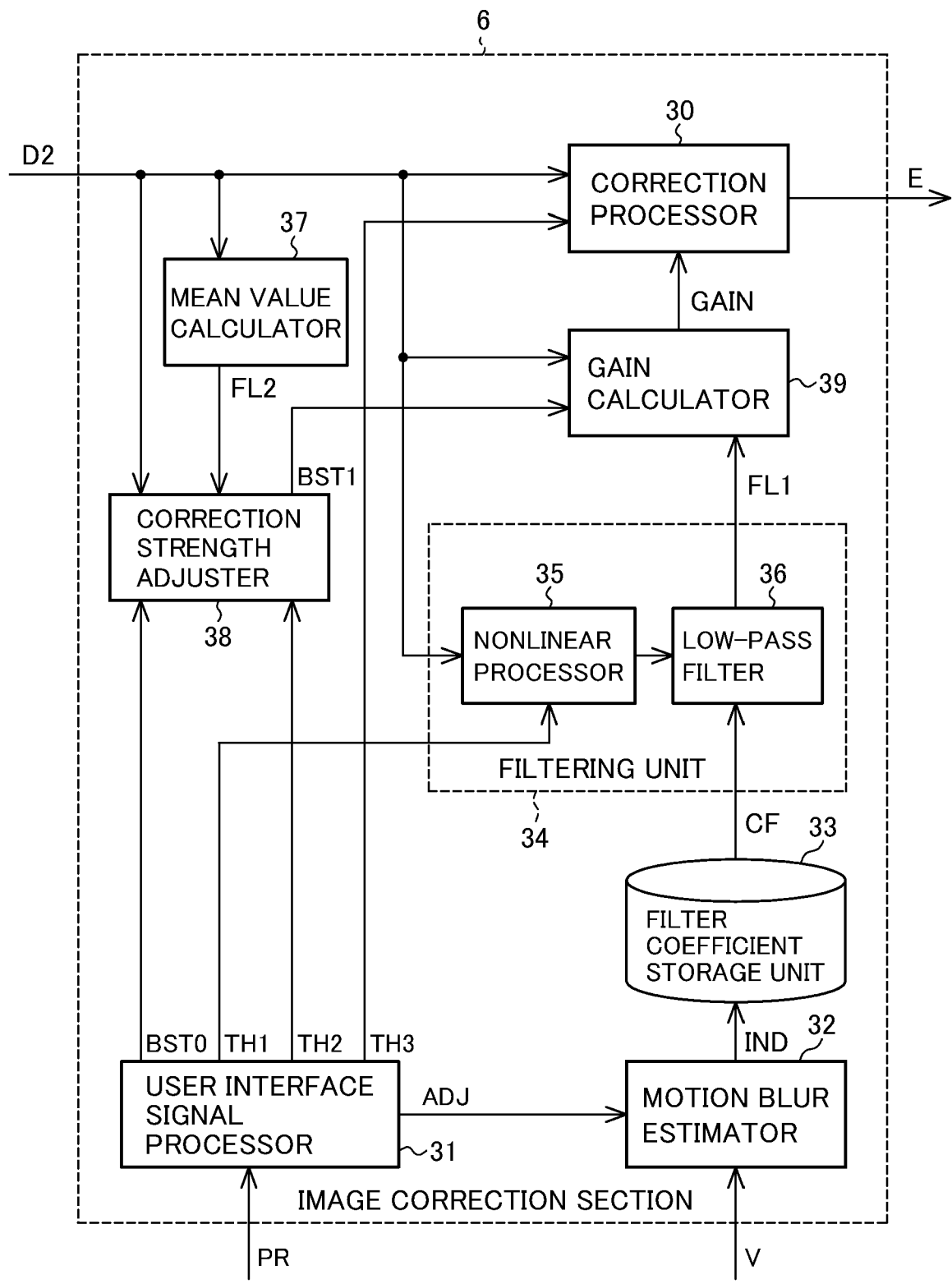
FIG. 17 is a block diagram showing an example of the structure of the image correction section in a second embodiment of the invention.

The second embodiment is generally similar to the first embodiment but uses the image correction section 6 shown in FIG. 17.

The image correction section 6 shown in FIG. 17 has the same block structure as in FIG. 5 except that the parameters output by the user interface signal processor 31 include a third threshold TH3, which is supplied to the correction processor 30, and the correction processor 30 operates according to threshold TH3. The purpose of threshold TH3 is to limit the correction, thereby preventing the overcorrection of pixel values.

When the correction processor 30 uses the gain value supplied by the gain calculator 39, despite the suppression of overshoot in the filtering unit 34 in the first embodiment, overshoot may still occur in the deblurred image. This is particularly apt to happen when the correction strength parameter BST0 is set to a high value.

In the second embodiment, overshoot is avoided by applying a clipping process to the result of the motion blur correction process. Specifically, the correction processor 30 uses the threshold TH3 received from the user interface signal processor 31 to carry out the same type of nonlinear process as in the filtering unit 34. When the absolute value of the difference between the uncorrected pixel value D2(i, j) of the pixel of interest and the product obtained by multiplying the pixel value D2(i, j) by the gain value GAIN(i, j) exceeds the threshold TH3, the corrected pixel value E(i, j) is made to satisfy the condition $$|E(i,j)-D2(i,j)|=TH3$$

When the absolute value of the difference between the uncorrected pixel value D2(i, j) of the pixel of interest and the product obtained by multiplying the pixel value D2(i,j) by the gain value GAIN(i, j) is equal to or less than the threshold TH3, the corrected pixel value E(i, j) is set equal to the product of GAIN(i, j) and D2(i, j) as in the first embodiment. The corrected value E(i, j) is accordingly determined so that:

(A) If GAIN(i, j)*D2(i, j)−D2(i, j)>TH3 then E(i, j)−D2(i, j)=TH3   (13a)

thus E(i, j)=D2(i, j)+TH3   (13b)

(B) If GAIN(i, j)*D2(i, j)−D2(i, j)<−TH3 then E(i, j)−D2(i, j)=−TH3   (13c)

thus E(i, j)=D2(i, j)−TH3   (13d)

(C) If other than (A) and (B)

then E(i, j)−D2(i, j)=GAIN(i, j)*D2(i, j)−D2(i, j)   (13e)

thus E(i, j)=GAIN(i, j)*D2(i, j)   (13f)

Both the first and second embodiments improve the quality of the displayed moving picture by detecting motion vectors between frames of the input video signal for individual pixels, detecting areas in which motion blur occurs in the picture, and correcting the motion blur by use of a gain tailored to the magnitude and direction of the motion blur.

What is claimed is:

1. An image processing device comprising:
a motion vector detection section for receiving a first video signal and a second video signal, the second video signal being equivalent to the first video signal with an advance or delay of at least one frame, and detecting therefrom a motion vector pertaining to a pixel of interest in the first video signal; and
an image correction section for using the motion vector detected by the motion vector detection section to reduce motion blur in the first video signal;
the image correction section including
a motion blur estimator for estimating, from the motion vector, a direction and a magnitude of the motion blur,
a filtering unit for filtering the first video signal, using filter coefficients corresponding to the estimated direction and magnitude, and
a correction strength adjuster for adjusting a strength of a correction applied to a pixel value of the pixel of interest, responsive to a degree of variation of pixel values in a vicinity of the pixel of interest, the degree of variation being expressed as a difference between the pixel value of the pixel of interest and a mean value of the pixel values in the vicinity; wherein
the filtering unit performs a low-pass filtering operation, using clipped pixel values obtained by clipping pixel values of pixels in a neighborhood of the pixel of interest so that an absolute value of a difference between the pixel value of the pixel of interest and the pixel values of the pixels in the neighborhood does not exceed a predetermined threshold.

2. The image processing device of claim 1, wherein the image correction section also includes:
a gain calculator for calculating a gain from a result of the low-pass filtering operation performed by the filtering unit; and
a correction processor for correcting the pixel value of the pixel of interest by multiplying the pixel value of the pixel of interest by the gain calculated by the gain calculator.

3. The image processing device of claim 2, wherein the image correction section also includes a filter coefficient storage unit for storing filter coefficients corresponding to a plurality of combinations of direction and magnitude of motion blur, the motion blur estimator selects the filter coefficients corresponding to the estimated direction and magnitude from among the filter coefficients stored in the filter coefficient storage unit, and the filtering unit uses the selected filter coefficients.

4. The image processing device of claim 2, wherein the correction strength adjuster outputs a correction strength parameter having a value adjusted according to the degree of variation of the pixel values in the vicinity of the pixel of interest, and the gain calculator calculates the gain from both the result of the low-pass filtering operation and the adjusted value of the correction strength parameter.

5. The image processing device of claim 4, wherein the gain calculator performs a calculation expressible as $$GAIN(i,j)=1+BST1(i,j)-BST1(i,j)*FL1(i,j)/D2(i,j)$$

BST1(i, j) being the adjusted value of the correction strength parameter,
FL1(i, j) being the result of the low-pass filtering operation,
D2(i, j) being the pixel value of the pixel of interest, and
GAIN(i, j) being the calculated gain.

6. The image processing device of claim 4, wherein the correction strength adjuster reduces the value of the correction strength parameter when the pixel of interest lies in an area where there is little variation in the pixel values.

7. The image processing device of claim 2, wherein the correction processor clips the corrected pixel value of the pixel of interest to avoid overcorrection of motion blur.

8. The image processing device of claim 7, wherein when an absolute value of the difference between the pixel value of the pixel of interest and a product obtained by multiplying the pixel value of the pixel of interest by the calculated gain is equal to or less than a second threshold value, the correction processor outputs said product, and when said absolute value of the difference exceeds the second threshold value, the correction processor outputs a value obtained by adding the second threshold value to the pixel value of the pixel of interest or subtracting the second threshold value from the pixel value of the pixel of interest.

9. The image processing device of claim 1, wherein non-zero values of the filter coefficients are confined to a band-shaped area extending in the estimated direction of the motion blur and having a length responsive to the estimated magnitude of the motion blur.

10. An image display device comprising:
the image processing device of claim 1; and
an image display unit for displaying an image generated by the image processing device.

11. An image processing method comprising:
  detecting a motion vector from a first video signal and a second video signal, the second video signal being equivalent to the first video signal with an advance or delay of at least one frame, the motion vector pertaining to a pixel of interest in the first video signal; and
  using the detected motion vector to reduce motion blur in the first video signal by
  estimating, from the motion vector, a direction and a magnitude of the motion blur,
  filtering the first video signal, using filter coefficients corresponding to the estimated direction and magnitude, and
  adjusting a strength of a correction applied to a pixel value of the pixel of interest, responsive to a degree of variation of pixel values in a vicinity of the pixel of interest, the degree of variation being expressed as a difference between the pixel value of the pixel of interest and a mean value of the pixel values in the vicinity of the pixel of interest; wherein
  filtering the first video signal further comprises performing a low-pass filtering operation, using clipped pixel values obtained by clipping pixel values of pixels in a neighborhood of the pixel of interest so that an absolute value of a difference between the pixel value of the pixel of interest and the pixel values of the pixels in the neighborhood does not exceed a predetermined threshold.

* * * * *